United States Patent Office 2,848,449
Patented Aug. 19, 1958

2,848,449
MORPHOLINOMETHYL KETONES

Armiger H. Sommers, Waukegan, Ill., assignor to Abbott Laboratories, North Chicago, Ill., a corporation of Illinois No Drawing. Application August 31, 1955
Serial No. 531,839

4 Claims. (Cl. 260—247.7)

This invention relates to a class of new and useful chemical compounds and to a method for making same.

More particularly, the invention relates to a group of chemical compounds characterized by the formula

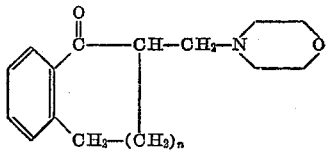

in which n is 1 or 2. The bases just described form acid addition salts with acid reacting compounds such as hydrochloric acid, sulfuric acid, fumaric acid, tartaric acid and the like. The bases may be either solids or liquids and the acid addition salts are crystalline solids.

The compounds of this invention exhibit a high degree of activity against fungi and particularly against *T. mentagrophytes* and *C. albicans*. In this respect the morpholinyl derivatives of this invention are suprisingly found to have activity far greater than the activity of the corresponding dialkylamino derivatives and the piperidyl derivatives.

The compounds of this invention are prepared by heating a compound of the formula

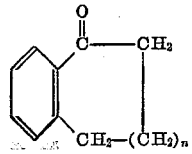

where n is 1 or 2 with a morpholine hydrohalide and formaldehyde or a formaldehyde yielding substance in a suitable solvent. The oil which separates from an aqueous solution of the reaction product which has been made basic is extracted with ether and the ultimate product is recovered therefrom. The acid addition salts are formed in a conventional manner by reaction with a suitable acid.

The following examples are presented in order to disclose the invention in greater detail but it should be understood that the invention is not intended to be limited in any way by the examples.

EXAMPLE I 2-(4'-morpholinylmethyl)-1-tetralone

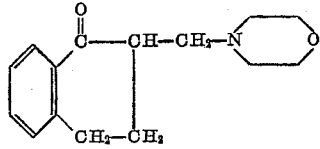

A mixture of 10 g. of 1-tetralone, 9 g. of morpholine hydrochloride and 8.3 cc. of 30% formalin is stirred under an atmosphere of nitrogen while heating on a steam bath for two hours. The mixture is treated with 75 cc. of ether. The aqueous layer is separated and made basic with ammonium hydroxide and the oil which separates is extracted in ether. Evaporation of the extract after drying over anhydrous magnesium sulfate yields 10 g. of material which is recrystallized from 50 cc. of petroleum ether to give 8.4 g. of crystalline product, 2-(4'-morpholinylmethyl)-1-tetralone, which melts at 76–78° C. Analysis calculated for $C_{15}H_{19}NO_2$: C, 73.4; H, 7.8; N, 5.7. Found: C, 73.3; H, 7.9; N, 5.5.

The hydrochloride salt resulting from the reaction of one mole of the above base with one mole of hydrogen chloride in anhydrous isopropyl alcohol is a white crystalline solid which melts at 165° C.

EXAMPLE II 2-(4'-morpholinylmethyl)-benzosuberone

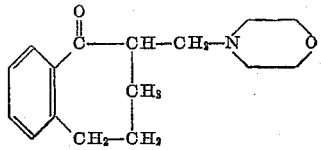

A mixture of 16 g. of benzosuberone, 12.3 g. of morpholine hydrochloride, 4.5 g. of paraformaldehyde, 0.25 cc. of concentrated hydrochloric acid and 75 cc. of isoamyl alcohol are heated to refluxing, and 3 g. more paraformaldehyde is added in portions to the mixture during 25 minutes. Then 0.3 cc. more of concentrated hydrochloric acid is added and the mixture heated 15 minutes longer. After cooling the reaction mixture is treated with 125 cc. of water and shaken with 200 c. of ether. The aqueous phase is made basic with aqueous sodium hydroxide and the resulting oil extracted in ether. Evaporation of the ether and distillation of the residue gives 6 g. of 6-(4'-morpholinylmethyl)-benzosuberone, distilling at 143° C. at 0.12 mm. with $n_D^{25}$ 1.5530.

Analysis calculated for $C_{16}H_{21}NO_2$: C, 74.1; H, 8.2; N, 5.4. Found: C, 73.8; H, 8.1; N, 5.4.

The hydrochloride salt prepared from the above base forms a white crystalline solid, which melts at 144° C.

Others may practice the invention in any of the numerous ways which will be suggested to one skilled in the art upon a reading of this specification. It is intended that all such practice of the invention be included hereunder provided it falls within the scope of the appended claims.

I claim:
1. A chemical compound selected from the class consisting of the base and the acid addition salts thereof in which the base has the formula

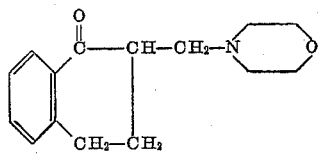

2. The acid addition salts according to claim 1.
3. 2-(4'-morpholinylmethyl)-1-tetralone.
4. 2-(4'-morpholinylmethyl)-1-tetralone hydrochloride.

References Cited in the file of this patent

Barltrop: J. Chem. Soc. (London) for 1946, pp. 958–65 (1946).

Tarbell et. al.: J. Am. Chem. Soc., vol. 74, pp. 6263–6 (1952).

Jilek et al.: Chemicke Listy, vol. 46, pp. 292–6 (1952); abstracted in Chem. Abst., vol. 47, cols. 4337–8.

Jilek et al.: Collection of Czechoslovak Chemical Communications, vol. 18, pp. 257–69 (1953); abstracted in Chem. Abst., vol. 47, col. 9928.

Blicke: Org. Reactions, vol. 1, chapter 10, pages 303–41 (1942).